United States Patent dos Santo Simoes et al.

Patent Number: 6,037,015
Date of Patent: Mar. 14, 2000

[54] METHOD FOR COLORING PIECES OF ROCKS BY LASER RAYS

[76] Inventors: Fernando Antonio dos Santo Simoes, Rua Vale de Milho, 58, Algueirao P-2725, Mem Martins; Joao Miguel Pinto Coelho, Rua d. Joao de Mascarenhas, 2-6° Esq. Damaia P. 2700, Amadora; Jose Manuel Marques Fernandes Rabaca, Rua "d " Lote 2, 4° Fte... Casal do C otao P-2735, Cacem, all of Portugal

[21] Appl. No.: 08/931,004

[22] Filed: Sep. 15, 1997

Related U.S. Application Data

[63] Continuation-in-part of application No. 08/676,117, filed as application No. PCT/PT94/00011, Oct. 25, 1994, abandoned.

[51] Int. Cl.[7] .............................. B05D 3/00; C23C 14/30; B28D 1/00
[52] U.S. Cl. .......................... 427/554; 427/555; 427/557; 427/596; 125/1
[58] Field of Search .................................. 427/554, 555, 427/557, 596, 597; 125/1; 63/32

[56] References Cited

U.S. PATENT DOCUMENTS

| | | | |
|---|---|---|---|
| 2,375,113 | 5/1945 | Klammt et al. | 427/557 |
| 5,410,125 | 4/1995 | Winston et al. | 219/121.69 |
| 5,753,887 | 5/1998 | Rosenwasser et al. | 219/121.68 |
| 5,760,367 | 6/1998 | Rosenwasser et al. | 427/555 |

FOREIGN PATENT DOCUMENTS

| | | |
|---|---|---|
| 58-82245 | 5/1983 | Japan . |
| 4-270685 | 9/1992 | Japan . |
| 1175723 | 8/1985 | U.S.S.R. . |

OTHER PUBLICATIONS

Translation of Japanese reference 58–82245 to Eiichirou Takiyama et al—pub. date Aug. 9, 1983.
Translation of USSR Inventor's Certificate to Motornyi et al pub date Aug. 30, 1985.
Translation of Japanese ref. 04–270685 to Uigunaraajiya et al, pub. date Sep. 28, 1992.

*Primary Examiner*—Marianne Padgett
*Attorney, Agent, or Firm*—Locke Reynolds LLP

[57] ABSTRACT

The invention relates to a method for coloring pieces of rock, namely marble, by means of the application of a laser beam (2) in order to color-mark or totally color the piece of rock. According to the invention, the laser beam interacts with the piece of rock (5), to which an appropriate coloring is subsequently applied. Diffusion of the pigment in the piece of rock changes its color in the area affected by the laser. The piece of rock takes on the color as intensely as desired. The invention enables marble of a lower value to be made more valuable and increases the value of other rocks and allows them to be colored. This application is mainly intended for the treatment of ornamental rocks.

14 Claims, 1 Drawing Sheet

METHOD FOR COLORING PIECES OF ROCKS BY LASER RAYS

CROSS-REFERENCE TO RELATED APPLICATION

This is a continuation-in-part of application Ser. No. 08/676,117, filed Jun. 25, 1996, now filed as PCT/PT94/00011, Oct. 25, 1994, now abandoned.

BACKGROUND OF THE INVENTION

The present invention relates to a method for coloring marble and other stones and rocks (for example granite) by the concerted application of an appropriate laser beam and coloring.

Marble is a crystalline granular limestone containing grains of calcite grouped in no particular pattern. When it is pure it is white and it takes on different tones when it contains accessory minerals such as quartz, garnet, mica, iron minerals and graphite. This coloring characterizes the type of marble.

The rarer the type of marble, the more expensive it is. As a result, it would be advantageous to apply permanent coloring to marble and other stones and rocks to enhance their value, by causing more common marble, stones and rocks to take on the appearance of less common, higher value materials.

SUMMARY OF THE INVENTION

The object of this invention is to enable lower quality marble to be made more valuable by coloring, and to allow the marble itself to be colored. It can also be applied to ornamental stones and rocks other than marble using coloring or color-marking processes.

According to the invention, a laser beam is applied to the piece of marble, stone or rock, interacting with the material and preparing it for application of an appropriate coloring. The area treated then takes on the desired color, not only superficially but throughout a preselected depth. The preselected depth may vary between a few millimeters to several centimeters, depending on the intensity and wavelength of the laser beam utilized.

The characteristics and advantages of the invention are highlighted in the sample description here under relating to the attached drawings.

DETAILED DESCRIPTION OF THE PREFERRED EMBODIMENTS

Figure 1:
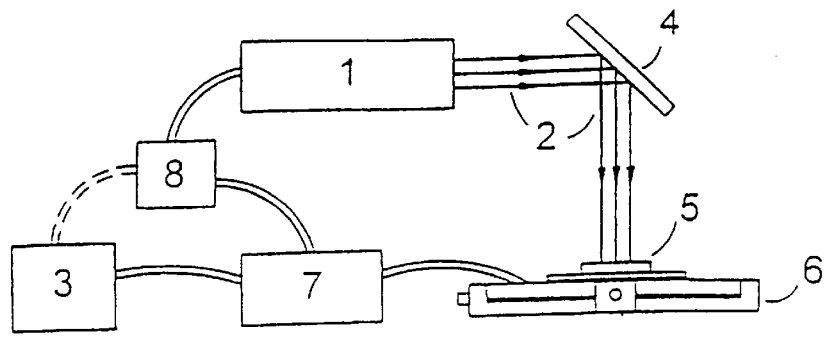
FIG. 1 represents one of the possible set-ups.

With the method of the present invention, usually marble and granite are utilized, although other stones and rocks may be treated. An important parameter is the quality of the surface of the stone, particularly as regards surface ruggedness and impurities. Where desired, a polishing process can be effected using specialized stone polishing sandpapers.

Selecting a uniform, unpolished and flat surface of a stone or rock, the stone or rock is placed in a shifting system with a X–Y axis, which makes linear shifts in such a way as to allow a laser beam to pass over a selected surface area thereof.

According to this invention a radiation beam (2) coming from the laser (1) is directed onto the piece of stone or rock to be colored (5). This beam is applied to the area in question directly or by means of a beam sweeping system. Any other more suitable method of application can be used. For this example, we will consider a simple application system by means of a mirror (4) at 45° which rotates the vertical beam, the laser being on the horizontal.

The piece of marble or other ornamental stone (5) should be moved towards the beam, although some application systems allow the beam to move itself. For this purpose, the most common shifting system involves a translation table on two axes (6), also known as the X–Y table, in order to achieve the uniform application of laser radiation.

The most usual way of controlling the process is by means of a numeric control device. CNC (7), which accepts computer commands (3) and controls the laser and the X–Y table. The parameters for laser emission are chosen through the respective control unit (8), which may or may not be computer-controlled.

There is naturally a large variety of means and devices for controlling this process which are not mentioned here.

For this invention there are many lasers able to color marble or other rocks in the way desired. The laser radiation which will be applied can vary from infrared to ultraviolet. However, some lasers produce better results than others. In a first embodiment, a continuous medium infrared laser may be used, and in a most preferred embodiment, a 10.6 $\mu$m $CO_2$ laser operating at a power of about 100 W applying energy at a density of between about 50 $J/cm^2$ and about 80 $J/cm^2$. It will be recognized that other continuous lasers emitting radiation in the medium infrared, that is, in the range of about 3 $\mu$m to about 30 $\mu$m, may be used within the method of the present invention. In a second embodiment, a pulsed laser may be used, and in another most preferred embodiment, a 308 nm XeCl excimer laser operating with 100 mJ pulses at 10 Hz applying energy at a density of between about 40 $J/cm^2$ and about 50 $J/cm^2$.

Figure 2:
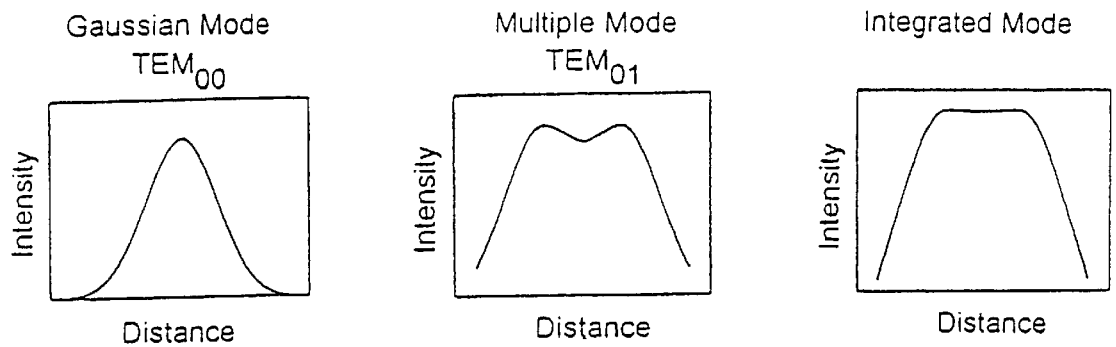
FIG. 2 shows the intensity distribution of three types of laser beam.

An important factor to be taken into account is the quality of the laser beam. FIG. 2 shows the most common intensity distributions: $TEM_{00}$, single mode distribution, known as "Gaussian distribution" and $TEM_{01}$ multiple ring mode.

The first is normally found in low power lasers whereas the second appears when the range of power of the lasers is increased. High power lasers sometimes have modes higher than $TEM_{01}$.

Although the beam mode used is not decisive for the process, it does have an influence on it. Thus, it is important that the area to be treated should be as uniform as possible in order to obtain uniform coloring, which makes a Gaussian mode beam preferable to a multiple mode. However, the ideal mode is obtained when the beam is made up of optic components suitable for this purpose and has approximately uniform intensity distribution. This distribution can also be observed in FIG. 2.

In any case, use of the Gaussian mode is perfectly satisfactory provided that shift speeds are guaranteed enabling consecutive beams to be superimposed in such a way that the effect thereof so similar to that of an integrated beam.

Figure 3:
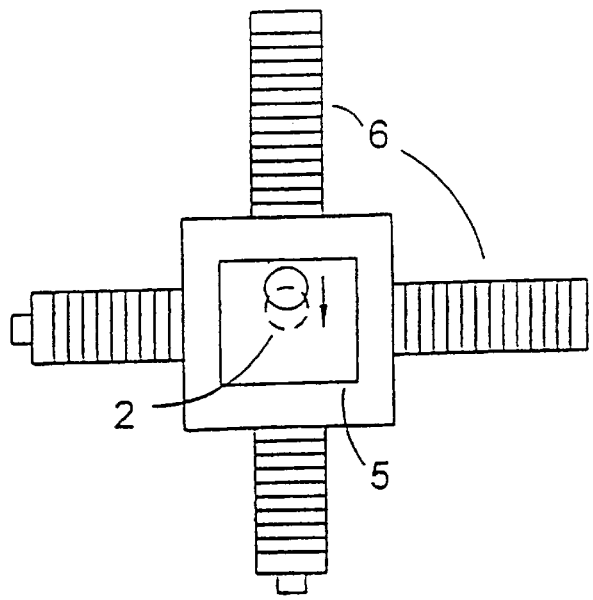
FIG. 3 is a plan of the device for moving the piece of rock to be colored, according to the set-up in FIG. 1.

Thus, FIG. 3 shows in relation to the set-up in FIG. 1 the displacement of the beam (2) along the piece of rock (5) carried out by the X–Y table (6) so as to obtain the desired effect.

Importantly, application of such laser beams increases the microscopic porosity of stones, rocks, and marble, which can be seen by analyzing them under an electronic microscope. Porosity increase of stones, rocks and marble due to laser beam action implies an increase in the material's diffusion coefficient.

The parameters to be used, like the laser power, impulse frequency (if the laser works as a pulse) and the speed of displacement of the piece of stone or rock (or beam) depend in each case particularly on the type of stone or rock, but also on the intensity of coloring desired, the way the beam is applied, etc.

Sometimes lower power can be used, provided that the laser is applied twice to the area in question.

After the laser treating process described, coloring or colorings are applied to the treated piece of marble, stone or rock in order to obtain the desired result. The colorings applied should preferably be liquids and offer high resistance to external agents such as water, cleaning products, etc. Subsequent to laser beam application, pigment is immediately applied over the treated surface, in order to achieve the best diffusion into the stone. Pigment application can be made in different ways: immersion of the piece in liquid ink, ink jet application to the treated area, and painting the surface with a brush. In any case, the stone, rock or marble is preferably treated with pigment until it reaches saturation, which can be achieved after a few seconds ($\approx$10 s) with immersion. With ink jet and painting application, the waiting time must be longer in order to achieve good absorption of the pigment. Windsor and Newton red and emerald green inks may be advantageously used as pigments. These two inks have different viscosity, with red more viscous than emerald green. Resistance of the coloring is thus guaranteed, as in the case of the actual piece of marble, stone or rock, whether it is polished or not. After laser treating and coloring, the marble, stone or rock is permanently colored to enhance its value, but without altering the quality of the material by damaging or compromising macroscopic structural characteristics such as those relating to strength, durability, and resistance to cracking, chipping and breaking.

Optionally, subsequent to coloring, a second laser beam application to the rock, stone or marble may be made, with lower power than the initial porosity increasing laser application, in order to allow the stone to improve its final quality, especially as regards surface protection. After the application of pigment to the stone, a laser beam may be applied over the pigmentation region at about 10% to 20% of the power of the initial application. This second, low power laser application may increase pigment adherence inside the rock, vaporizing the pigment's liquid component.

Thereafter, the surface of the stone, rock or marble may be polished in order to improve its final quality. Polishing also increases protection against external abrasive substances, enhances coloration quality, and verifies that pigmentation in the laser treated area is permanent. Polishing eliminates thin pigment layers wherever the diffusion coefficient is small, i.e. regions where the laser beam was not applied. Untreated regions lose their surface pigmentation and laser treated areas sustain their color, indicating that areas treated with the laser beam are regions where a very large amount of pigmentation diffusion occurs.

The physical processes associated with these results are mainly supported by the diffusion of material, more precisely solid-liquid diffusion. The main purpose of using laser radiation is to increase microscopic porosity so that pigment diffusion in the crystalline lattice is increased. Under electronic microscopy, it appears that porosity of the stone does increase after application of laser radiation. Different wavelength utilization gives different possibilities for achieving the same purpose, which is to increase the stone's porosity. Indeed, tests with an Nd:YAG laser radiating at 1.06 $\mu$m revealed similar porosity increasing effects. In that case, penetration depths were lower (3–4 mm), apparently because the energy density was very low.

Laser radiation utilization with the present invention is not by chance. Attempts were made to obtain the same results with a normal thermal process, such as flames, and normal radiation, such as radiation emitted by a flash lamp. In the first case, stones warmed up, sometimes cracked, and the pigment did not spread into the material. In the second case, diffusion occurred very slowly with penetration of less than 3 mm. The main reason for these unfavorable situations appeared to be a lack of increased surface porosity. The type of radiation source and energy and power densities are important parameters for uniform pigmentation diffusion and successful stone coloration.

Nevertheless, changing porosity may not be the only reason for the enhancement of stone pigmentation by the method of the present invention, because it is found that ultraviolet radiation creates less porosity than infrared radiation despite greater penetration depth. A possible explanation may be a higher depth of interaction between ultraviolet laser radiation and the stone's crystalline lattice (photon-phonon interaction). However, there may be other mechanisms responsible for the effectiveness of the present invention.

During experiments, higher penetration depths were obtained with the same pigments for specific marble stones having higher initial surface porosity, with penetration up to about 3 cm. Another important parameter which can increase the diffusion coefficient and penetration depth is the degree of impurities present in the rock, stone, or marble Pigment penetration depth can be increased if laser energy density is increased. However, if this increment is very high, important chemical reactions start occurring (for example calcium carbonate into calcium oxide) and the stone's quality decreases. Another important effect which may occur is non-uniform pigment absorption whenever there are many impurities. In this case, energy absorption may also be non-uniform, greatly affecting the diffusion coefficient and penetration depth. In the particular case of granite, serious problems occur if power density is increased because granite has large quantities of silica. As silica absorbs large quantities of radiation, the silica on the stone's surface will melt and eliminate pore formation. In this situation, the pigment does not spread through the stone and simply makes up a surface pigment layer. Laser power density applied to the surface of the rock, stone or marble is an important parameter which has to be controlled carefully in order to increase penetration depth without generating adverse collateral effects.

The following example illustrates the invention without, however, any limited aspects.

Example 1

Using an assembly as illustrated in FIG. 1, with a $CO_2$ laser and an X–Y table, both controlled by a CNC able to receive instructions from a computer, a piece of white Estremoz marble with grey veins about 5 mm thick can be colored all over its surface by applying approximately 140 W of laser power (output) by a beam of about 8 mm in diameter and with Gaussian distribution intensity. The piece of rock is shifted at an approximate speed of 2 cm/s and the beam is applied all the way through, after which fine ink is applied thereto (permanent ink, in this case "Vividian" emerald green ink produced by Windsor and Newton), which can be applied with a paintbrush or by immersion of the piece of rock.

Example 2

For a 10.6 μm continuous $CO_2$ laser operating at 100 W applied to marble, the following results were obtained:

| energy density 75 J/cm² | polished surface | | unpolished surface | |
|---|---|---|---|---|
| pigment | emerald green | red | emerald green | red |
| mean penetration depth | 1.4 cm | 0.8 cm | 1.2 cm | 0.7 cm |

Example 3

For a 10.6 μm continuous $CO_2$ laser operating at 100 W applied to granite, the following results were obtained:

| | energy density 60 J/cm² | | | |
|---|---|---|---|---|
| | polished surface | | unpolished surface | |
| pigment | emerald green | red | emerald green | red |
| mean penetration depth | 0.9 cm | 0.6 cm | 0.5 cm | 0.5 cm |

Example 4

For a pulsed 308 nm XeCl excimer laser operating with 100 mJ pulses at 10 HZ applied to marble, the following results were obtained:

| | energy density 40 J/cm² | | | |
|---|---|---|---|---|
| | polished surface | | unpolished surface | |
| pigment | emerald green | red | emerald green | red |
| mean penetration depth | 1.7 cm | 1.2 cm | 1.5 cm | 1.2 cm |

Example 5

For a pulsed 308 nm XeCl excimer laser operating with 100 mJ pulses at 10 HZ applied to granite, the following results were obtained:

| | energy density 40 J/cm² | | | |
|---|---|---|---|---|
| | polished surface | | unpolished surface | |
| pigment | emerald green | red | emerald green | red |
| mean penetration depth | 1.4 cm | 1.0 cm | 1.1 cm | 0.7 cm |

The invention should be considered as limited by the following claims only.

What is claimed is:

1. A method of coloring a stone, which is a granite or a crystalline granular limestone having an initial porosity, which comprises the steps of:

illuminating the stone with a laser beam at an energy density of between about 40 and about 80 J/cm² to increase the porosity of the stone to at least a preselected depth; and subsequently applying a colored pigment to a region of the stone previously illuminated by the laser beam for a time sufficient to allow penetration of the colored pigment into the stone to at least the preselected depth, thereby coloring a portion of the stone.

2. A method, in accordance with claim 1, wherein the laser beam has a wavelength between about 3 μm and about 30 μm.

3. A method, in accordance with claim 1, further comprising the step of scanning the laser beam relative to the stone during the illuminating step.

4. A method, in accordance with claim 1, further comprising the step of at least partially vaporizing a liquid component of the pigment subsequent to the penetration of the pigment into the stone.

5. A method, in accordance with claim 1, wherein the stone is the crystalline granular limestone.

6. A method, in accordance with claim 5, wherein the stone is marble.

7. A method, in accordance with claim 1, further comprising the step of moving the stone relative to the laser beam during the illuminating step.

8. A method, in accordance with claim 7, wherein said moving step is accomplished by controlling the movement of a translation table with a numeric control device.

9. A method, in accordance with claim 7, wherein said moving step is accomplished at a rate of about 2 cm/sec.

10. A method, in accordance with claim 1, further comprising the step of polishing a surface of the stone confronting the laser beam.

11. A method, in accordance with claim 1, wherein the laser beam has a wavelength of about 10.6 μm.

12. A method, in accordance with claim 1, wherein the laser beam is about 8 mm in diameter.

13. A method, in accordance with claim 1, wherein the preselected depth is between about 0.3 cm and about 3.0 cm.

14. A method of coloring a marble stone having an initial porosity, which comprises the steps of:

illuminating the marble stone with a laser beam of about 8 mm in diameter having a wavelength of between about 3 μm and about 30 μm and an energy level of between about 40 and about 80 J/cm² to increase the porosity of the marble stone to at least a preselected depth;

moving the marble stone relative to the laser beam during the illuminating step with a numeric controlled translation table at a rate of about 2 cm/sec., and subsequently applying a colored pigment to a region of the stone previously illuminated by the laser beam for a time sufficient to allow penetration of the colored pigment into the stone to at least the preselected depth, thereby coloring a portion of the stone.

* * * * *

UNITED STATES PATENT AND TRADEMARK OFFICE
CERTIFICATE OF CORRECTION

PATENT NO. : 6,037,015
DATED : March 14, 2000
INVENTOR(S) : dos Santo Simoes, et al.

Page 1 of 1

It is certified that error appears in the above-identified patent and that said Letters Patent is hereby corrected as shown below:

On the Title Page,
Please insert the following: [63] Continuation-in-part of application No.08/676,117, June 25, 1996, filed as application No. PCT/PT94/00011, Oct. 25, 1994, abandoned.

Signed and Sealed this

Twenty-fourth Day of July, 2001

*Attest:*

NICHOLAS P. GODICI
*Attesting Officer*     *Acting Director of the United States Patent and Trademark Office*